United States Patent Office 3,637,727
Patented Jan. 25, 1972

3,637,727
PROCESS FOR PRODUCING N-CARBOXY ANHYDRIDES OF AMINO ACIDS
Yasuo Fujimoto and Keizo Tatsukawa, Machida-shi, and Yoichi Koiwa, Tokyo, Japan, assignors to Kyowa Hakko Kogyo Co., Ltd., Chiyoda-ku, Tokyo, Japan
No Drawing. Filed May 15, 1968, Ser. No. 729,460
Claims priority, application Japan, May 17, 1967, 42/30,877; May 22, 1967, 42/32,107, 42/32,108
Int. Cl. C07d 85/34
U.S. Cl. 260—307 B
20 Claims

ABSTRACT OF THE DISCLOSURE

A process for the preparation of highly pure N-carboxy anhydrides of amino acids which comprises suspending an amino acid in an inert organic solvent and reacting with phosgene in the presence of a metal salt, metal oxide, or a powdered metal or alloy at a temperature of at least 50° C. The reaction may also be effected in the absence of the additive if it is carried out in a solvent comprising an aromatic nitro compound or an aromatic halogen compound, or if it is conducted at a temperature above 60° C. in a mixed hydrocarbon solvent of an aliphatic hydrocarbon and an aromatic hydrocarbon, the latter being a petroleum fraction.

---

The present invention relates to a process for producing N-carboxy anhydrides (hereinafter termed NCA) of amino acids or derivatives thereof. More particularly, this invention relates to NCA derivatives of amino acids having the following general formula:

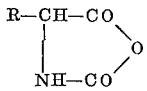

wherein R is a hydrogen atom, unsubstituted or substituted alkyl, cycloalkyl, aryl, aralkyl, alkaryl, heterocyclic or alkyl having a cycloalkyl or heterocyclic group, the substituent being at least one of alkyl, aryl, aralkyl, alkaryl, nitro, $OR_1$, $OOCR_1$, $OCOOR_1$, $COOR_1$ $COSR_1$, $OSO_2R_1$, $SO_2R_1$, $SR_1$, $NHSO_2R_1$, $NHCOOR_1$ $NHCOSR_1$, $NHCOR_1$, $SSR_2$, $NHSR_2$, $NHR_2$,

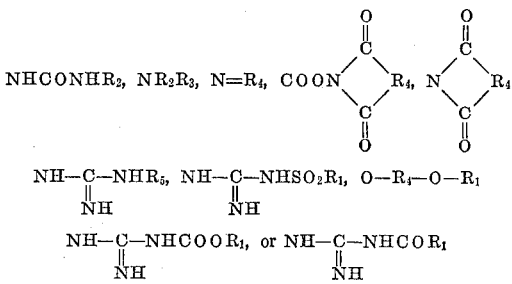

wherein $R_1$ is the same as R defined above, $R_2$ and $R_3$ are the same as R defined above with the exception of the hydrogen atom, $R_4$ is unsubstituted or substituted alkylidene, arylidene, aralkylidene, alkarylidene, heterocyclic or alkylidene having a cycloalkyl or heterocyclic group and $R_5$ is a nitro or sulfonyl group. Even more particularly, the invention relates to the production of NCA derivatives of amino acids, the starting amino acids having the following general formula:

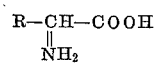

wherein R is as defined above, which comprises reacting phosgene with said amino acids under particular reaction conditions.

As is well known in the art, NCA derivatives of amino acids readily release carbon dioxide by the action of appropriate initiators (for example, organic bases such as diethylamine, triethylamine and the like) in suitable solvents (for example, halogenated aliphatic hydrocarbons such as dichloro-methane, dichloro-ethane, chloroform and the like; esters such as ethyl acetate; ethers such as dioxane; or mixtures of these various solvents) to polymerize as shown in the following reaction scheme:

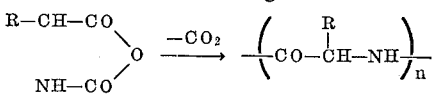

wherein R is as defined above. The resultant polymers (hereinafter termed polyamino acids) are useful materials with a wide range of applications, for example, as synthetic fibers, synthetic leather and the like. The polymers are also model substances of proteins.

It is essential to obtain very highly pure NCA derivatives in order to produce polyamino acids having a high degree of polymerization. Side reaction products contained in NCA derivatives, such as, isocyanates, carbamyl chlorides and the like of the starting amino acid employed, lower the quality of the resultant polyamino acid. Therefore, complicated methods of purification to remove such impurities have been used in the prior art.

Halogen-containing compounds, in particular, are impurities which constitute a serious drawback in producing polyamino acids having a high degree of polymerization and a high quality [note, for example, J. Am. Chem. Soc., vol. 76, p. 4492 (1954)]. Hence, as a general procedure, several recrystallizations are usually conducted [Noguchi et al., Seni Kagaku Kenkyusho (Institute of Textile Science), Annual Report No. 17, p. 30 (1964)].

In the prior art, various methods for the chemical synthesis of NCA derivatives of amino acids have been suggested. For example, after the amino acid is reacted with phosgene in dioxane, the reaction mixture is concentrated to dryness to separate the crude NCA derivative, or, after the reaction mixture is concentrated under reduced pressure, the crude NCA derivative is precipitated from a concentrated mixture by adding a non-solvent of the NCA compound, such as, petroleum ether. In either case, it is known that during the course of the concentration, a coloring and degradation of the NCA compound takes place. Also, another disadvantage is that chlorine-containing impurities such as the following contaminate the final product:

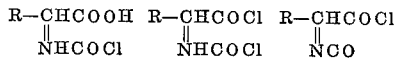

These compounds are intermediates or concomitants resulting from an incomplete or side reaction. Since these impurities adversely affect the polymerization reaction of NCA derivatives, highly pure NCA compounds are required, as noted above, as the raw material for the polymerization reaction. The tolerable content of chlorine in NCA derivatives of amino acids is considered to be about 0.01 to 0.03% by weight. In order to manufacture such highly pure NCA compounds, the crude NCA compounds produced by the above methods must be purified by complicated methods, such as, by repeated recrystallization several times.

For the purpose of eliminating these disadvantages, Japanese Patent Publication 94/65 suggests reaction with phosgene in dichloroethane and suggests that the preferred reaction temperature is 30–50° C., with the explanation that side reactions occur, instead of the main reaction, to form the desired NCA compound, at temperatures exceeding this range. In this suggested method, the contact time is relatively long, for example, 5–8 hours. Furthermore, the yield of crude NCA compound obtained is low, for example, 55.7–74%.

Japanese patent publication 7382/67 suggests the use of γ-methyl-L-glutamate hydrochloride and recites that a highly pure NCA derivative can bt obtained even in the presence of coexisting glutamic acid when the hydrochloride is used. It is further stated that this method is more advantageous than the method wherein free esters are used. However, in spite of the fact that according to this patent, the required time for reaction with phosgene is one to two hours, the present inventors have found from their own experiments that the reaction time must be considerably longer, for example, three to four hours, depending upon the particle size of the raw material (amino acid) used. Furthermore, in view of industrial considerations of economics, it is important that the loss upon the recovery of the solvent used for the phosgenation be minimized. However, the halogenated aliphatic hydrocarbons used in the above method are gradually decomposed at high temperature.

Other methods have also been used in the prior art for the chemical synthesis of NCA derivatives. One of these processes involves suspending the amino acid reactant in a solvent which is capable of solubilizing the desired NCA compound, such as dioxane or ethyl acetate, and reacting the amino acid with phosgene. Hoyever, when a NCA derivative is synthesized in these solvents, in general, it is essential to recrystallize the resultant NCA product several times, since side reactions such as the following are inevitable because of the long time of reaction between the amino acid and phosgene which is required:

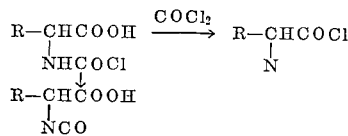

Alternatively, the invention described in U.S. Pat. 2,993,053 suggests the phosgenation of α-amino acids in aromatic hydrocarbons such as benzene, toluene, and xylene. However, this patent discloses that the α-amino acid must be phosgenated after grinding it to a fine powder having a size not greater than 5μ in such a solvent, and that the reaction must be conducted by critically controlling the addition rate of both the raw material α-amino acid and phosgene in such a manner that they are added in an equimolar relationship with respect to each other. Otherwise, an effective phosgenation cannot be attained. Furthermore, although the invention described in said U.S. Pat. 2,993,053 produces NCA derivatives having a lower halogen content than that of previous methods, the halogen content is still considerably high, i.e., 0.4–3.2% by weight. Hence, according to U.S. Pat. 2,996,513, issued to the same inventors, highly pure NCA compounds useful as raw materials for manufacturing high quality polymers cannot be obtained without purification by dehalogenating in the presence of special solvents such as dimethyl formamide. Again, this is disadvantageous from an industrial point of view.

All of these deficiencies and drawbacks noted in the prior art led the present inventors to conduct a great deal of research on the various problems involved. As one factor, the present inventors noticed that NCA compounds are synthesized from amino acids according to the following reaction [Advances in Protein Chemistry, Academic Press, Inc. New York, N.Y., vol. 8, p. 268 (1958)]:

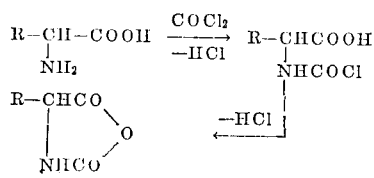

The important point to note is the dehydrohalogenation reaction. It was found by the present inventors that NCA compounds having little or no halogen-containing impurities could be produced in good yield when glutamic acid-γ-esters are reacted with phosgene in suitable solvents (Japanese application 3859/67, corresponding to copending U.S. application Ser. No. 697,576, filed on Jan. 15, 1968, now abandoned). Further research has shown that various additives, as discussed hereinbelow, surprisingly promote the dehydrohalogenation reaction so that the NCA compound-forming reaction proceeds rapidly and selectively.

The present inventors have also studied the solvents which do not give rise to the undesirable side reactions or do not dissolve the side reaction products and have found that aliphatic nitriles, such as acetonitrile, propionitrile and the like, halogenated aliphatic hydrocarbons, nitrated aromatic compounds and halogenated aromatic hydrocarbons are suitable reaction solvents permitting the formation of highly pure NCA compounds (Japanese patent application 82945/66, the aforementioned U.S. Ser. No. 697,576, and Japanese Pat. application 30877/67).

Heretofore, phosgenation in a solvent containing aliphatic hydrocarbons was not considered to be a suitable method. This was because aliphatic hydrocarbons, being constituted only by carbon and hydrogen, are considered to be a non-solvent for NCA derivatives and thus to be unsuitable as a reaction solvent to be employed in the synthesis of these compounds. This was particularly thought to be true in view of the fact that aliphatic hydrocarbons were previously used as a precipitating agent for NCA derivatives from reaction liquors containing NCA derivatives, i.e., with the object of making the NCA compounds difficultly soluble. For example, aliphatic hydrocarbons were added in order to precipitate the NCA compounds after the amino acid had been phosgenated to the NCA product in a solvent such as benzene, toluene, or the like.

One of the objects of the present invention is to provide an improved process for the production of N-carboxy anhydrides of amino acids which overcomes the disadvantages and deficiencies of the prior art methods.

Another object of the present invention is to provide a process for producing said compounds (NCA derivatives) which may be carried out in an industrially efficacious manner.

A further object of the invention is to provide a process for preparing NCA derivatives which may be carried out advantageously on an industrial scale to give a high yield of product.

A still further object of the invention is to provide highly pure N-carboxy anhydrides of amino acids or derivatives thereof.

In short, it is the over-riding object of the present invention to eliminate the disadvantages of the prior art and to provide highly pure NCA compounds selectively and in good yield by means of a process which can be carried out economically in a short time.

These and other objects and advantages of the present invention will become apparent to those skilled in the art from a consideration of the following specification and claims.

The present invention comprises a number of embodiments. It has been found, in accordance with this invention, that various additives, for example, salts such as $K_2CO_3$, $Na_2CO_3$, NaCl, LiCl, KCl, etc.; oxides such as $Al_2O_3$, CuO, etc.; or powders of metals or alloys such as Al, Zn, Fe, Co, brass, Ni-Al alloys, Fe-Cu alloys, etc., surprisingly promote the dehydrohalogenation reaction so that the principal reaction forming the NCA derivatives is effected rapidly and selectively.

With respect to this first embodiment of the present invention, when NCA compounds are made from amino acids, as discussed in connection with the reaction equations shown above, the amino acid is first carbamylchlorinated; then the N-carbamyl chloride is dehydrohalogenated to form the NCA derivative. Two moles of hydrogen chloride must be liberated in order to obtain one mole of NCA compound from one mole of amino acid. Thus, in the practice of the present invention, although any amino acid and its salt with acid may be employed, the use of free amino acids is more reasonable and advantageous as a method for synthesizing NCA derivatives.

Accordingly, the disadvantages which are encountered when only the reaction solvent is used, as in the previous art, are all eliminated, and highly pure NCA compounds can be obtained in a short time and selectively in good yield. The crude NCA derivatives obtained in accordance with this invention contain far less impurities comprising halogen compounds than those of the prior art. Thus, NCA compounds recrystallized from suitable solvents such as ethyl acetate, dioxane, halogenated hydrocarbons, etc., substantially do not contain halogen impurities. When such NCA compounds are polymerized by employing a proper organic base as the polymerization initiator, a very high quality of polyamino acid can be obtained. For example, in the case of poly-α-methyl-L-glutamate, a high quality of polymeric solution is obtained having a polymerization degree above 3,000. The solution is clear and highly viscous and does not contain insoluble materials. It has a high spinnability.

Another embodiment of the present invention comprises reacting the amino acid and phosgene together with heating in a mixture of an aliphatic hydrocarbon and an aromatic hydrocarbon, the latter being obtained during the process of refining crude petroleum oil or during the process of manufacturing aromatic hydrocarbons from aliphatic hydrocarbons. In this way, highly pure NCA compounds having very little content of halogen impurities can be produced in high yield. Since hydrocarbon mixtures of this type are very cheap compared with the conventional solvents and are considered to be a crude product in the petro-chemical industry, the employment of such a mixture is a most economical and industrial mode for producting NCA compounds. In addition, contrary to the previously known methods in which the crude crystalline product is obtained generally by concentrating the reaction solvent under reduced pressure to isolate the NCA derivative formed from the reaction liquor, or by adding to the concentrated liquid a poor solvent for the NCA derivative such as petroleum ether, the present inventors have found that very highly pure NCA derivatives can be readily produced by cooling the reaction liquor as it is to room temperature.

As a third embodiment of the present invention, it has been found that when the phosgenation reaction is conducted by using halogenated aromatic compounds or aromatic nitro compounds as the reaction solvent, side reactions hardly occur and highly pure NCA compounds can be formed in good yield in a short time. Again, this process is especially economical and advantageous since it has been found that highly pure NCA derivatives can be readily obtained in good yield by cooling the reaction liquid as it is to room temperature.

As the starting raw material of the present invention, α-amino acids, i.e., neutral amino acids, ω-monoesters of acidic amino acids, N-substituted derivatives of basic amino acids or the like, can be employed. For example, amino acids or amino acid derivatives (or their hydrochloride, sulfate, phosphate and the like), such as glycine, alanine, α-amino butyric acid, valine, norvaline, leucine, iso-leucine, nor-leucine, phenylalanine, O-substituted serine, O-substituted homoserine, O-substituted threonine, S-substituted cysteine, cystine, methionine, β-monoester of aspartic acid, γ-monoester of glutamic acid, δ-monoester of α-aminoadipic acid, $N^{im}$-substituted histidine, proline, $N^\delta$-substituted ornithine, $N^\epsilon$-substituted lysine, and N-guanido-substituted arginine or the like, which can synthesize NCA derivatives by the reaction with phosgene, can all be used.

The amino acid used may be either optically active or optically inactive, but for the purpose of obtaining a higher degree of polymerization of the corresponding polyamino acid, optically active amino acids are preferably employed.

A preferred mode of carrying out the first embodiment of the present invention comprises suspending the amino acid in an appropriate solvent, conducting the reaction by adding a suitable amount of additive (which may be added before or during the phosgenation reaction either gradually or all at one time) and passing phosgene through the solution. The latter step may be accomplished by adding a solvent in which phosgene has been absorbed to the reaction mixture. After the completion of the NCA compound-forming reaction (generally after 10–90 minutes), the additive, which is insoluble in the solvent, is filtered off, the filtrate is concentrated and the resultant concentrate is cooled in order to crystallize the NCA derivative. In such a case, a non-solvent for the amino acid-NCA compound (for example, petroleum ether, ether, n-hexane and the like) may be added to the reaction mixture. Also, after finishing the reaction, the unreacted excess of phosgene may be expelled with dry nitrogen, carbon dioxide, or the like. The crude NCA compound thus obtained contains very little halogen (normally, of the order of 0.01–0.05% by weight). However, if necessary, it may be recrystallized from a solvent such as dioxane, ethyl acetate, ethylenedichloride, trichloroethylene, trichloroethane, tetrachloroethane and the like, or mixtures thereof. By recrystallization, NCA derivatives containing substantially no halogen impurities can be obtained.

The reaction is generally conducted at a temperature above 50° C. (below this temperature, the reaction requires a longer time and the product NCA compound contains more halogen and has a low purity). It is preferred to finish the reaction in as short a time as possible when the temperature is above the melting point of the NCA derivative obtained by the reaction because of the decompositions and side reactions which occur at such temperatures.

In this embodiment of the present invention, any compound having a boiling point above 50° C. and belonging to the classes of compounds comprising ethers, esters, ketones, nitriles, nitro compounds, halogenated hydrocarbons and hydrocarbons which do not interfere with the phosgenation reaction, and which may be aliphatic, aromatic, alicyclic or heterocyclic, can be employed as the solvent. Of course, these solvents may be used either alone or as a mixed solvent thereof. Examples of usable solvents include, for example, ethers such as iso-propyl ether, n-propyl ether, ethyl n-butyl ether, iso-butyl ether, n-butyl ether, iso-amyl ether, dioxane, chloromethyl ether, chloromethyl ethyl ether, dichloromethyl ether, β-chloroethyl ether, dichloroethyl ether, ethylene glycol diethyl ether, ethylene glycol dimethyl ether, propylene glycol dimethyl ether, propylene glycol diethyl ether, benzyl methyl ether, benzyl ethyl ether, anisole, O-cresyl methyl ether, m-cresyl methyl, ether, p-cresyl methyl ether, phenetole, tetrahydrofuran and the like; esters of organic acids, such acetic acid, formic acid, butyric acid, iso-butyric acid, iso-valeric acid, valeric acid, aceto-acetic acid, benzoic acid, phenylacetic acid and the like or of carbonic acid, of methyl ethyl, iso-propyl, n-propyl, iso-butyl, n-butyl, sec-butyl, iso-amyl, n-amyl, 2-ethyl-1-hexyl, chloromethyl, β-chloroethyl, cyclohexyl, benzyl, tetrahydrofurfuryl, O-cresyl, m-cresyl, p-cresyl, phenyl, ethylene glycol, propylene glycol and the like moieties; intra-molecular esters such as γ-butyro-lactone, γ-valero-lactone, β-butyro-lactone, β-valero-lactone and the like; ketones such as acetone, methyl ethyl ketone, diethyl ketone, isomers of dipropyl ketone, isomers of dibutyl ketone, isomers of methyl propyl ketone, isomers of methyl butyl ketone, dicyclohexyl ketone, cyclopentanone, cyclohexanone, acetophenone, benzophenone, ditolyl ketone, cyclohexyl phenyl ketone, methyl tolyl ketone, acetylacetone, chloroacetone, dichloroacetone, chloromethyl ethyl ketone, acetonylacetone, mesityl oxide and the like; nitriles such as acetonitrile, isomers of propionitrile, isomers of butyronitrile, isomers of valero-nitrile, benzonitrile, furonitrile, and the like; nitro compounds such as nitromethane, nitroethane, nitropropane, nitrobutane, nitrobenzene, nitrotoluene and the like; chloroform, carbon tetrachloride, isomers of dichloroethane (1,1-dichloroethane, 1,2-dichloroethane), dichloroethylene, isomers of trichloroethane, isomers of tetrachloroethane, pentachloroethane, isomers of dichloropropane, isomers of trichloropropane, isomers of tetrachloropropane, isomers of dichloropropylene, isomers of monochlorobutane, isomers of dichlorobutane, isomers of monochloropentane, isomers of dichloropentane, isomers of monobromopropane, isomers of monobromobutane, isomers of monobromopentane, dibromomethane, isomers of dibromoethane, isomers of dibromopropane, isomers of dibromoethylene, isomers of dibromopropylene, isomers of dibromobutane, isomers of dibromopentane, and the like.

The salt or powdered metal or alloy which is used as an additive may be any substance which is substantially difficult to dissolve or substantially insoluble in the solvent used in the present invention, for example, that described above, and which forms by the reaction with hydrogen chloride a salt which is substantially difficult to dissolve or insoluble in the said solvent. Examples of the usable additives include salts such as halides, oxides, sulfates, phosphates, silicates, carbonates and the like of various metal elements and the powders of metals such as Cu, Ag, Mg, Zn, Al, Sn, Pb, Ti, Zr, Ta, Cr, Mo, W, Mn, Fe, Co, Ni and the like or the powders of alloys made from two or more of the above-mentioned metals. The amount of additive to be employed is sufficiently effective if the amount is two or less equivalents with respect to the amount of amino acid. However, of course, an amount more than two equivalents may be used.

Referring to the second major embodiment of the present invention, a preferred mode of conducting the reaction is to suspend the starting amino acid or derivative thereof in a suitable hydrocarbon mixture which has a boiling point above 60° C. and which contains one or more aromatic hydrocarbons mixed therewith. Reaction is effected by heating to above 60° C. and passing phosgene gas through thhe mixture. As noted above, the phosgene may also be added to the mixture by adding solvent-containing phosgene to the reaction solution. After the reaction has been completed, the reaction liquid is filtered if insoluble materials are present therein, and the clear reaction liquid is cooled in order to separate highly pure NCA compounds. In this case, of course, non-solvents for the NCA compounds, such as petroleum ether, aliphatic hydrocarbons and the like, may be added. Also, the reaction liquid may be concentrated under reduced pressure in order to reduce the amount of residual NCA compound in the mother liquor. Further, prior to the crystallization after the reaction, the remaining phosgene in the reaction liquid may be removed by passing an inert gas, such as nitrogen, carbon dioxide, air or the like, through the reaction mixture.

Again, the NCA compound product obtained contains very little halogen impurity (usually, of the order of 0.02–0.1% by weight). However, if necessary, as discussed above, the product may be recrystallized by conventional methods. In this way, NCA derivatives containing substantially no halogen impurities can be produced.

In this embodiment, the reaction is generally effected at a temperature above 60° C. However, it is again to be noted that when the reaction temperature is above the melting or decomposition point of the product, it is desirable to complete the reaction in as short a time as possible in order to avoid decomposition and/or side reactions.

Suitable solvents to be used in this embodiment of the present invention are selected from the mixed solvents whose fractions have boiling points above 60° C., and which do not interfere with the phosgenation reaction and contain at least one or more aromatic hydrocarbons. Generally, they are obtained during the process of refining petroleum crude oil or during the manufacturing process for aromatic hydrocarbons from aliphatic hydrocarbons. Generally, it is preferable to use a solvent containing more than 50% of aromatic hydrocarbon. For example, Solb-Esso 100 (trade name) of Esso-Standard Petroleum Co. (fractions, 158–177° C.; aromatic component, 98%), Solb-Esso 150 (trade name) (fractions, 185–211° C.; aromatic component, 97%), Esso-Aromatic Naphtha No. 1 (trade name) (fractions, 102–138° C.; aromatic component, 60%), Supersol (trade name) of Mitsubishi Petroleum Co. (fractions 101–131° C.; aromatic component 73%), Swasol 200 (trade name) of Maruzen Petroleum Co. (fractions, 133–154° C.; aromatic component, 73%), SBPX-6 (trade name) of Shell Chemicals Co. (fractions, 95–132° C.; aromatic component, more than 70%), Shell-Sol E (trade name) (fractions, 160–200° C., aromatic component, 84%), etc. are already sold commercially and are quite suitable as a reaction solvent herein. Besides these, various fractions which are produced during the refining process of petroleum crude oil or the manufacturing process for aromatic hydrocarbons may be used. Also, the solvents which are prepared by mixing not more than an equal amount of an aliphatic hydrocarbon with an aromatic hydrocarbon may be used.

Referring to the third embodiment of the present invention discussed hereinabove, the starting amino acid or derivative thereof is suspended in a solvent containing at least one halogenated aromatic hydrocarbon or nitroaromatic hydrocarbon and is reacted, while being heated to above 50° C., by passing phosgene gas therethrough or by adding said solvent containing phosgene thereto. Subsequent steps, such as filtration, cooling, concentration under reduced pressure and removal of excess phosgene may be conducted as discussed above. The NCA derivative thus obtained contains very little halogen (usually, of the order of 0.01–0.05% by weight). Again, recrystallization may be carried out in order to obtain NCA derivatives containing substantially no halogen impurities.

The caveat concerning the temperature of reaction set forth hereinabove also applies to the present embodiment of the present invention.

Suitable solvents to be used in this embodiment of the invention may be any solvent which does not interfere with the phosgenation reaction and comprise mainly aromatic halogenated compounds, aromatic nitro compounds, or mixtures thereof. For example, nitrobenzene, isomers of nitrotoluene, chlorobenzene, isomers of dichlorobenzene, benzyl chloride, isomers of chlorotoluene, suitable solvents which may be employed.

In summary, it can be seen that the present invention comprises a process for producing N-carboxy anhydrides of amino acids or related derivatives thereof which is characterized by reacting phosgene with an amino acid contained in an organic solvent. A wide variety of solvents may be employed and, in particular, include mixed aromatic and aliphatic hydrocarbons, aromatic nitro compounds or aromatic halogenated compounds. If a metal, an alloy, or suitable salts thereof are added to the reaction mixture, then a wide variety of solvents, including ethers, esters, ketones, nitriles, nitro compounds, halogenated hydrocarbons and hydrocarbons may be used.

The following examples are given merely as illustrative of the present invention and are not to be considered as limiting. Unless otherwise noted, the percentages therein and throughout the application are by weight.

EXAMPLE 1

15 g. of γ-methyl-L-glutamate is suspended in 150 ml. of ethylene chloride and 2.4 g. of potassium carbonate is added. The reaction suspension is brought to a temperature of 70–80° C.; then a solution which is prepared by dissolving 10 g. of phosgene into 100 ml. of ethylene chloride is added, and the phosgene is reacted for 40 minutes under reflux. Then, after the insoluble salt and residues are filtered off and the mother liquor is concentrated, 16.5 g. of crude NCA is obtained by cooling to 0° C. The product which is obtained by recrystallization of the crude NCA from ethylene chloride has little or no halogen content (0.005%) and comprises white crystals which have a melting point of 99.5–100° C. The total yield after recrystallization is 91.4%.

EXAMPLE 2

15 g. of γ-methyl-L-glutamate is suspended in 150 ml. of ethylene chloride and 2.1 g. of sodium carbonate is added. Reaction with phosgene is conducted similarly as in Example 1. After about 40 minutes of phosgenation, the insoluble materials are removed by filtration and 16.1 g. of crude NCA is obtained by concentrating the mother liquor. The residual amount of halogen is 0.02%. The melting point of the product is 99.0–99.5° C.

EXAMPLE 3

24 g. of γ-benzyl-L-glutamate is suspended in 375 ml. of a mixed solvent of ethylene chloride-tetrachloroethane (vol. ratio, 1:1) and 2 g. of potassium carbonate is added. The temperature is brought to 70–80° C. A solution which is prepared by absorbing 15 g. of phosgene into 100 ml. of ethylene chloride is added and the reaction is conducted for 30 minutes under reflux, and thereafter, the insoluble materials are removed. The filtrate is concentrated, and 24 g. of the NCA of γ-benzyl-L-glutamate is obtained. The amount of residual halogen is 0.02%.

EXAMPLE 4

15 g. of γ-methyl-L-glutamate is suspended in 150 ml. of ethylene chloride and 1.5 g. of potassium chloride is added. While the temperature is maintained at about 75° C., phosgene gas is passed through the suspension for 60 minutes. Thereafter, the insoluble materials in the solvent are removed, the filtrate is concentrated, and 16.2 g. of NCA is obtained. The halogen content is 0.02%.

EXAMPLE 5

15 g. of γ-methyl-L-glutamate is suspended in 150 ml. of pentachloroethane and, as to the additive, lithium chloride is used instead of potassium chloride. Carrying out the procedure similarly to that described in Example 4, 16.1 g. of NCA is obtained. The halogen content is 0.02%.

EXAMPLE 6

When the reaction is effected similarly as described in Example 5, except for using 1.0 g. of powdered iron as the additive, 16.0 g. of NCA is obtained. The halogen content is 0.02%.

EXAMPLE 7

Using 20 g. of aluminum oxide as the additive, the reaction is again carried out as described in Example 2. As a result, 16.5 g. of NCA is obtained. The halogen content is 0.01%.

EXAMPLE 8

After 20 g. of L-alanine is suspended in 500 ml. of 1,2-dichloropropane and phosgene is vigorously blown in for 40 minutes at 90° C. while adding 2 g. of powdered copper, the reaction solution is filtered after passing nitrogen gas through the solution for 15 minutes. The filtrate is concentrated under reduced pressure. Thereafter, it is allowed to stand in a cold room (5° C.) and the crystals formed are filtered. 22.8 g. of the NCA of alanine is obtained. [Yield: 88.7%, halogen content: 0.01%, melting point 92–93° C., (decomposition.)]

EXAMPLE 9

28 g. of $N^\epsilon$-carbobenzoxy-L-lysine is suspended in 400 ml. of 1,2-dibromopropane and, while 5 g. of sodium sulfate is being added, phosgene is vigorously blown into the solution for 60 minutes at 90° C. Thereafter, when the reaction mixture is treated similarly as in Example 8, 27.3 g. of the NCA of $N^\epsilon$-carbobenzoxy-L-lysine is obtained. [Yield: 89.3%, halogen content: 0.03%, melting point: 99–101° C.]

EXAMPLE 10

15 g. of γ-methyl-L-glutamate is suspended in 300 ml. of methyl ethyl ketone, 1.5 g. of powdered copper is added, phosgene gas is passed through the suspension vigorously for 30 minutes under reflux, and thereafter, excess phosgene is expelled by introducing nitrogen gas. Then, the reaction mixture is filtered to remove insoluble materials, the filtrate is concentrated under reduced pressure, petroleum ether is added, and then the resultant solution is allowed to stand in cold room (5° C.) After filtration of the crystals which have separated, 15.7 g. of NCA is obtained. The halogen content is 0.03%.

EXAMPLE 11

10 g. of S-carbobenzoxy-L-cysteine is suspended in 200 ml. of isopropyl acetate, 4 g. of lithium chloride is added, and phosgene gas is passed through the suspension for 20 minutes at 70–80° C. Thereafter, when the operation is carried out similarly as in Example 10, 10.1 g. of the NCA of S-carbobenzoxy-L-cysteine is obtained. [Halogen content: 0.02%, melting point: 76–78° C. (decomposition.)]

EXAMPLE 12

20 g. of β-benzyl-L-aspartate is suspended in 400 ml. of acetonitrile, phosgene gas is passed through for 50 minutes under reflux, during which 1.5 g. of potassium carbonate is added, and then excess phosgene is expelled with carbon dioxide. Thereafter, when the operation is carried out similarly as in Example 10, 19.9 g. of the NCA of β-benzyl-L-aspartate is obtained. [Halogen content: 0.03%; melting point: 120–122° C.]

EXAMPLE 13

10 g. of L-phenylalanine is suspended in 200 ml. of dioxane, and phosgene is passed through for 30 minutes while adding 1 g. of a Ni-Al (1:1) alloy powder, the temperature being maintained at 80–90° C. Thereafter, when the reaction is conducted similarly as in Example 8, 10.7 g. of NCA of L-phenylalanine is obtained. (Halogen content, 0.05%; melting point, 95–96° C. (decomposition.))

EXAMPLE 14

10 g. of L-leucine is suspended in 100 ml. of benzene, 1.5 g. powdered copper is added, and while the mixture is being maintained at 75–80° C., 150 ml. of a 10% solution of phosgene in benzene is added in dropwise fashion. After the reaction has been conducted for 40 minutes, when carried out similarly as in Example 10, 10.8 g. of the NCA of L-leucine is obtained. (Halogen content, 0.03%; melting point, 77–79° C.)

EXAMPLE 15

Employing O-acetylhydroxyproline, toluene and powdered iron (instead of L-leucine, benzene and powdered copper, respectively), a similar operation as in Example 14 is conducted at 90° C. 10.3 g. of the NCA of O-acetyl-L-hydroxyproline is obtained. (Halogen content, 0.02%; melting point, 118–120° C. (decomposition.))

EXAMPLE 16

Employing O-acetyl-L-tyrosine, nitrobenzene and 2 g. of sodium sulfate (instead of L-leucine, benzene and powdered copper, respectively) a similar operation to that described in Example 14 is conducted. As a result, 9.5 g. of the NCA of O-acetyl-L-tyrosine is obtained. (Halogen content, 0.02%; melting point, 121–123° C.)

EXAMPLE 17

Employing L-tryptophan, chlorobenzene and a mixture of potassium chloride and alumina (1:1) (instead of L-leucine, benzene and powdered copper, respectively), a similar operation as that described in Example 14 is conducted at 85–90° C. As a result, 10.7 g. of the NCA of L-tryptophan is obtained. [Halogen content, 0.01%; melting point, 132–134° C.]

EXAMPLE 18

20 g. of γ-methyl-L-glutamate is suspended in a mixed solution of 200 ml. of benzene and 200 ml. of Esso-Aromatic Naphtha No. 1 (trade name of Esso-Standard Petroleum Co.), and phosgene gas is passed through the suspension for 90 minutes at 80° C. When the thus obtained clear reaction liquid is cooled in a cold room while stirring, white crystals of the NCA of γ-methyl-L-glutamate are obtained. [Yield, 18.5 g.; melting point, 98–99° C.; Halogen content, 0.1%.]

EXAMPLE 19

20 g. of γ-methyl-L-glutamate is suspended in 600 ml. of Shell-Sol E (trade name of Shell Chemicals Co.), and phosgene gas is passed through the solution for 80 minutes at 90° C. Thereafter, nitrogen gas is passed through into the clear reaction liquid obtained to expel the excess of phosgene. Then, the liquid is concentrated under reduced pressure and is allowed to stand in a cold room. White crystals of the NCA of γ-methyl-L-glutamate are obtained. [Yield, 18.7 g.; melting point, 98–99° C.; halogen content, 0.08%.]

EXAMPLE 20

To 20 g. of γ-benzyl-L-glutamate, 500 ml. of Solb-Esso 100 (trade name of Esso-Standard Petroleum Co.) is added and 100 ml. of Esso-Aromatic Naphtha No. 1 (trade name of Esso-Standard Petroleum Co.) in which 13 g. of phosgene is dissolved is slowly dropped in at 90–95° C. The reaction is conducted for 90 minutes under the reflux of phosgene. Then, nitrogen gas is passed through into the reaction mixture to remove the excess of phosgene and the mixture is filtered. The filtrate is concentrated under reduced pressure, and petroleum ether is added to the concentrate, which thereafter is crystallized in a cold room. 20.1 g. of the NCA of γ-benzyl-L-glutamate is obtained. [Halogen content, 0.04%; melting point, 96.5–97.5° C.]

EXAMPLE 21

28 g. of N$^\epsilon$-carbobenzoxy-L-lysine is added to 600 ml. of a mixed solution (1:4) of toluene and Supersol 800 (trade name of Mitsubishi Petroleum Co.). When the operation is carried out similarly as described in Example 19, 26.0 g. of the NCA of N$^\epsilon$-carbobenzoxy-L-lysine is obtained. [Melting point, 98–99° C.; halogen content, 0.07%.]

EXAMPLE 22

10 g. of L-leucine is added to 500 ml. of SBPX 6 (trade name of Shell Chemicals Co.) and phosgene gas is passed through for 120 minutes while heating at 75° C. When the reaction is conducted similarly as in Example 20, 11.1 g. of the NCA of L-leucine is obtained. [Melting point, 77.5–78.5° C.; halogen content, 0.1%.]

EXAMPLE 23

20 g. of γ-methyl-L-glutamate is suspended in 300 ml. of chlorobenzene and phosgene gas is passed through the suspension for 90 minutes at 80° C. When the clear reaction liquid obtained is cooled in a cold room with stirring, finely divided white crystals of the NCA of γ-methyl-L-glutamate are produced. [Yield, 18.8 g.; melting point, 98–99° C.; halogen content, 0.03%.]

EXAMPLE 24

35 g. of γ-methyl-L-glutamate is suspended in 600 ml. of o-dichlorobenzene and phosgene is passed through the suspension for 80 minutes at 80–85° C. Thereafter, after nitrogen gas has been passed through the clear reaction liquid obtained in order to remove the excess of phosgene, the solution is concentrated under reduced pressure and is allowed to stand in a cold room. White crystals of the NCA of γ-methyl-L-glutamate are obtained. [Yield, 36.6 g.; melting point, 97.5–98.5° C.; halogen content, 0.02%.]

EXAMPLE 25

To 25 g. of γ-benzyl-L-glutamate, 500 ml. of nitrobenzene is added, and 100 ml. of nitrobenzene containing 15 g. of dissolved phosgene is slowly added dropwise at 90–95° C. The reaction is conducted for 90 minutes under the reflux of phosgene. Thereafter, nitrogen gas is passed through the reaction liquid to remove the excess of phosgene. The reaction mixture is filtered and the filtrate is concentrated under reduced pressure. Petroleum ether is added to the concentrate, which is then precipitated in a cold room. As a result, 25.5 g. of γ-benzyl-L-glutamate is obtained. The halogen content thereof is 0.02%.

EXAMPLE 26

To 28 g. of N$^\epsilon$-carbobenzoxy-L-lysine, 600 ml. of chlorotoluene is added. When the operation is conducted similarly as in Example 24, 27.5 g. of the NCA of N$^\epsilon$-carbobenzoxy-L-lysine is obtained. [Melting point, 98–99° C.; halogen content, 0.04%.]

EXAMPLE 27

10 g. of L-leucine is added to a mixed solution of 100 ml. of chlorobenzene and 100 ml. of benzene. After phosgene gas is passed through the suspension for 120 minutes at about 75° C., an operation similar to that described in Example 25 is conducted. 11 g. of the NCA of L-leucine is obtained. [Melting point, 77–79° C.; halogen content, 0.02%.]

The invention being thus described, it will be obvious that the same may be varied in many ways. Such variations are not to be regarded as a departure from the spirit and scope of the invention, and all such modifications are intended to be included herein.

We claim:

1. A process for the preparation of an N-carboxy anhydride of an α-amino acid with phosgene at a temperature of 50° to the reflux temperature of the reaction system in an inert organic solvent having a boiling point above 50° C. in the presence of at least one additive selected from the group consisting of (1) metal salts comprising a cation selected from the group consisting of K, Na and Li and an anion selected from the group consisting of the halides, sulfate, phosphate and carbonate, (2) oxides of a metal selected from the group consisting of Al and Cu, (3) metal powders selected from the group consisting of Cu, Ag, Zn, Al, Fe, Co and Ni and (4) metal alloys selected from the group consisting of brass, Ni-Al and Fe-Cu.

2. The process of claim 1, wherein the additive is an elemental metal powder selected from the group consisting of Cu, Ag, Zn, Al, Fe, Co and Ni.

3. The process of claim 1, wherein the additive is a metal oxide selected from the group consisting of $Al_3O_3$ and CuO.

4. The process of claim 1, wherein the additive is a metal alloy selected from the group consisting of brass, Ni-Al and Fe-Cu.

5. The process of claim 1, wherein said amino acid is optically active.

6. The process of claim 1, wherein the resultant crude product is recrystallized from a solvent therefor.

7. The process of claim 1, wherein the additive is a metal salt selected from the group consisting of $K_2CO_3$, $Na_2CO_3$, NaCl, LiCl, KCl and $Na_2SO_4$.

8. A process for the preparation of an N-carboxy anhydride of an α-amino acid with phosgene at a temperature of 60° C. to the reflux temperature of the reaction system in an inert hydrocarbon solvent consisting essentially of a mixture of at least one aliphatic hydrocarbon and at least one aromatic hydrocarbon, said solvent having a boiling point above 60° C. and being selected from the group consisting of petroleum fractions having a boiling point of 158–177° C. and an aromatic content of 98%, a boiling point of 185–211° C. and an aromatic content of 97%, a boiling point of 102–138° C. and an aromatic content of 60%, a boiling point of 101–131° C. and an aromatic content of 73%, a boiling point of 133–154° C. and an aromatic content of 73%, a boiling point of 95–132° C. and an aromatic content of more than 70% and a boiling point of 160–200° C. and an aromatic content of 84%.

9. The process of claim 8, wherein said hydrocarbon solvent is obtained from a process for refining crude petroleum oil.

10. The process of claim 8, wherein said hydrocarbon solvent is obtained from a process for manufacturing aromatic hydrocarbons from aliphatic hydrocarbons.

11. The process of claim 8, wherein said hydrocarbon solvent is a petroleum crude.

12. The process of claim 8, wherein the reaction liquor, after the completion of the reaction, is cooled to room temperature.

13. The process of claim 8, wherein said amino acid is optically active.

14. The process of claim 8, wherein the resultant crude product is recrystallized from a solvent therefor.

15. A process for the preparation of an N-carboxy anhydride of an α-amino acid with phosgene at a temperature of 50° C. to the reflux temperature of the reaction system in an inert organic solvent selected from the group consisting of nitrobenzene, isomers of nitrotoluene and halogen compounds of benzene, toluene and xylene.

16. The process of claim 15, wherein the inert organic solvent is nitrobenzene or nitrotoluene.

17. The process of claim 15, wherein the inert organic solvent is a halogen compound of benzene, toluene or xylene.

18. The process of claim 15, wherein said amino acid is optically active.

19. The process of claim 15, wherein the resultant crude product is recrystallized from a solvent therefor.

20. The process of claim 15, wherein the reaction liquor, after the completion of the reaction, is cooled to room temperature.

References Cited

UNITED STATES PATENTS 2,653,947   9/1953   Ott _____ 260—307

RAYMOND V. RUSH, Assistant Examiner